US010990559B2

United States Patent
Wang et al.

(10) Patent No.: US 10,990,559 B2
(45) Date of Patent: Apr. 27, 2021

(54) SERIAL COMMUNICATION PROTOCOL

(71) Applicant: Dialog Semiconductor (UK) Limited, London (GB)

(72) Inventors: Shaoxuan Wang, Beijing (CN); Yuchuan Shi, Beijing (CN); Ze Han, Beijing (CN); Lingxin Kong, Beijing (CN); Nailong Wang, Beijing (CN)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/568,840

(22) Filed: Sep. 12, 2019

(65) Prior Publication Data

US 2020/0042487 A1 Feb. 6, 2020

Related U.S. Application Data

(63) Continuation of application No. PCT/CN2018/099002, filed on Aug. 6, 2018.

(51) Int. Cl.
   *G06F 13/42* (2006.01)
(52) U.S. Cl.
   CPC ...... *G06F 13/4256* (2013.01); *G06F 13/4291* (2013.01)
(58) Field of Classification Search
   CPC .......................... G06F 13/4256; G06F 13/4291
   See application file for complete search history.

(56) References Cited

U.S. PATENT DOCUMENTS

| 8,335,868 | B2* | 12/2012 | Pyeon ................. G06F 13/4291 710/8 |
| 9,946,680 | B2* | 4/2018 | Chavez .................... G06F 1/266 |
| 10,055,376 | B1* | 8/2018 | Newkirk ............. G06F 13/4291 |
| 2008/0059671 | A1* | 3/2008 | Blumcke ............... H04L 12/403 710/110 |
| 2009/0144471 | A1* | 6/2009 | Lin ...................... G06F 13/4252 710/110 |
| 2017/0277644 | A1* | 9/2017 | Baba ..................... G06F 13/404 |
| 2018/0276157 | A1* | 9/2018 | Lofamia ............... G06F 13/364 |

FOREIGN PATENT DOCUMENTS

WO    WO 2017/053012    3/2017

OTHER PUBLICATIONS

PCT Search Report, International Application No. PCT/CN2018/099002, Applicant: Dialog Semiconductor (UK) Limited et al., dated May 9, 2019, 9 pages.

* cited by examiner

*Primary Examiner* — Henry Tsai
*Assistant Examiner* — Christopher A Daley
(74) *Attorney, Agent, or Firm* — Saile Ackerman LLC; Stephen B. Ackerman

(57) ABSTRACT

A serial communication protocol for daisy-chained slave devices does away with the requirement for an entire byte of dummy clocks to be cycled between a slave's input and output, instead requiring a shorter set of dummy clock cycles which improves efficiency of a serial communication system. According to a specification of a serial communications protocol, data is exchanged between master and slave devices in communication frames. Each communication frame has a command portion and a data portion, and each respective portion may comprise packages of one or more bytes.

24 Claims, 11 Drawing Sheets

SERIAL COMMUNICATION PROTOCOL

This application is a Continuation application (DS18-079G) of application no. PCT/CN2018/099002, filed on Aug. 6, 2018, owned by a common assignee, and which is herein incorporated by reference in its entirety.

TECHNICAL FIELD

The present disclosure relates to a serial communication protocol, and to methods and apparatus that implement the protocol.

BACKGROUND

An example of a serial communication protocol is that implemented by the serial peripheral interface (SPI). This is a popular communication interface used in embedded systems and various other contexts.

While SPI is not formally standardized, FIG. 1 illustrates the characteristics of an SPI interface. A master device 100 communicates with one or more slave devices 102 and the devices exchange different types of logic signals. A first logic signal SCK 104 is a clock that is output by the master and is used to co-ordinate the timing of events in the operation of the SPI protocol. A second logic signal 106 is a slave input signal, which inputs data to the slave, either from the master 100 or from another slave in a daisy chain configuration. This is normally referred to as a master output slave input (MOSI) signal. A third logic signal MISO 108 is a slave output signal and is for the output of data by a slave, to be provided as an input for the master 100 or another slave in a daisy chain configuration. This is normally referred to as a master input slave output (MISO) signal. A fourth logic signal 110 is a slave select signal, which is output from the master 100. It is often active low and is used to selectively enable communication of a slave device 102 with a master device 100.

Because SPI is not a formalized standard, the specific labels of the logic signals 104 through 110 can vary from implementation to implementation. For example, the slave select signal 110 may also be referred to as SS and the clock is commonly referred to as CLK or SCLK.

The SPI bus can operate with a single master device and one or more slave devices. If a single slave device is used, as illustrated in the example of FIG. 1, then the slave select signal 110 may be fixed at a logic low.

Many SPI devices are not individually addressable. If it is required to communicate between multiple devices, modifications are required. FIG. 2 illustrates an arrangement of parallel slave connection, wherein a master microcontroller 200 is provided with a plurality of slave select outputs 210, one being provided for each slave 102 and numbered in this diagram as CSB1, CSB2 through CSBn for slaves 102a, 102b through 102N, where N is the total number of slaves in the system.

Each slave 102 is driven by the same clock SCK and the microcontroller 200 allots an independent slave select signal to each slave device 102 so that they can be addressed individually. Each of the slave devices 102 has the same address, and a single slave output line 208 is used to command all the slaves. Because all the slaves share the same clock and data lines, only the slaves with their active low slave select inputs asserted low will acknowledge and respond to the activity on the clock and data lines.

This system becomes hard to implement when the number of slaves gets larger. An alternative that can reduce hardware and layout complexity is to daisy chain slaves together, meaning that slaves' data inputs and outputs are connected in series with each other. An example of this is shown in FIG. 3.

Here, all slaves 302 share the same clock 104 and slave select signal 110. However, in this configuration only the first slave 302a receives data directly from the microcontroller 300. The remaining slaves, slaves 302b through 302N (where N is the total number of slave devices) each receive their data from the slave output logic signal of the preceding slave 302 in the chain. In effect, the slave devices 302 act as a single large shift register. Data that is output by the master 300, slave input signal (MOSI, 306), is input to the first slave 302a and then sent to each successive slave 302b through 302n. It is possible that only two slaves are provided in a daisy chain configuration.

The device address of each slave 302 is automatically set by the position of the slave in the chain. The first device has a device address DevAddr=0x01, the second device in the daisy chain has a device address DevAddr=0x02, and so on. Device addresses 0x00 and 0x3F are used for special broadcast writing commands as described below.

According to this protocol, a certain number of bytes need to be written during write or read operations, depending on the number of devices, which are in the daisy chain. This means that approximately M*N dummy clock cycles are required, where M is the number of bits in a byte, and N is the number of slaves in a daisy chain configuration.

As mentioned above, daisy chaining slave devices gives improved layout and hardware efficiencies as compared to connecting them in parallel. However, when the number of daisy chain devices starts to become large, then the number of dummy clock cycles that are required creates an increasing delay in the time taken to populate the registers of each slave device. This increasing delay decreases the efficiency of the system.

SUMMARY

According to a first aspect of the disclosure, there is provided a serial communication apparatus, comprising a master device having a master input and a master output, a plurality of slave devices, each comprising a slave input and a slave output, the plurality being arranged in a daisy chain configuration where a first slave device is arranged to receive data from the master output at its slave input and one or more successive slave devices are arranged to receive data from a slave output of a preceding slave device, where the master device is arranged to send a communication frame that comprises a sub-byte syllable which selectively triggers transmission of data from a slave input to a slave output.

Optionally, the communication frame includes a device address byte defining a slave device address, and the sub-byte syllable is provided as an initial portion of the address byte.

Optionally, the triggered transmission of data from slave input to slave output commences before the remainder of the device address byte is received by the slave input.

Optionally, the sub-byte syllable comprises one bit.

Optionally, the single bit is held at a first logic value to indicate the beginning of a communication frame.

Optionally, a final slave device adjusts a delay to ensure that the input to the master is byte-aligned.

Optionally, the adjustment of the delay is set by a special command embedded in the communication frame, preferably in the address byte.

Optionally, the adjustment of the delay is set by a register in the slave device, which has a value that can be set to inform one slave to be byte-aligned.

Optionally, the serial communication apparatus is configured such that each slave device stores its identity to determine its position in the chain of slave devices, and during transmission of a communication frame data is passed from a slave input to a slave output in the same clock cycle.

Optionally, the serial communication apparatus is configured such that, during the transmission of an initial communication frame, each slave device is configured to determine its position in the chain based on a delay between the slave input and slave output for that slave. and thereafter during transmission of subsequent communication frames, data is passed by the slaves from their slave inputs to their slave outputs in the same clock cycle.

Optionally, the serial communication apparatus comprises a serial peripheral interface.

According to a second aspect of the disclosure there is provided a serial communication apparatus, comprising a master device having a master input and a master output, a plurality of slave devices, each comprising a slave input and a slave output, the plurality being arranged in a daisy chain configuration where a first slave device is arranged to receive data from the master output at its slave input and one or more successive slave devices are arranged to receive data from a slave output of a preceding slave device, where each slave device stores its identity to determine its position in the chain of slave devices and during the transmission of a communication frame data is passed from a slave input to a slave output in the same clock cycle.

Optionally, the serial communication apparatus is configured such that during the transmission of an initial communication frame each slave device is configured to determine its position in the chain based on a delay between the slave input and slave output for that slave, and thereafter during transmission of subsequent communication frames, data is passed by the slaves from their slave inputs to their slave outputs in the same clock cycle.

Optionally, the delay between the slave input and slave output is k bytes, where k is the position of the slave in the chain.

Optionally, the delay between the slave input and slave output is k sub-byte syllables, where k is the position of the slave in the chain.

It will be appreciated that the features of the second aspect may be combined with the features of the first aspect—the "zero delay" concept included in the second aspect may make use of the "bit-aligned" concept of the first aspect in order to enumerate slave device addresses in those specific embodiments where an initialization step is needed. As such, all features of the first aspect may themselves be included as component parts of the second aspect. Equally, the "zero delay" concept included in the second aspect may make use of the known byte-aligned method for slave device address enumeration if desired.

The present disclosure also includes methods, which are implemented by the first and second aspects. According to a third aspect of the disclosure there is provided a method of communicating data between devices in a serial communication apparatus, the serial communication apparatus comprising a master device having a master input and a master output, a plurality of slave devices, each comprising a slave input and a slave output, the plurality being arranged in a daisy chain configuration where a first slave device is arranged to receive data from the master output at its slave input and one or more successive slave devices are arranged to receive data from a slave output of a preceding slave device, where, according to the method the master device sends a communication frame that comprises a sub-byte syllable, and a slave device receives the communication frame at its slave input, and then outputs data at its slave output upon receipt of the sub-byte syllable.

Optionally, the communication frame includes a device address byte defining a slave device address, and the sub-byte syllable is provided as an initial portion of the address byte.

Optionally, the triggered transmission of data from slave input to slave output commences before the remainder of the device address byte is received by the slave input.

Optionally, the sub-byte syllable comprises one bit.

Optionally, the single bit is held at a first logic value to indicate the beginning of a communication frame.

Optionally, a final slave device adjusts a delay to ensure that the input to the master is byte-aligned.

Optionally, the adjustment of the delay is set by a special command embedded in the communication frame, preferably in the address byte.

Optionally, the adjustment of the delay is set by a register in the slave device, which has a value that can be set to inform one slave to be byte-aligned.

Optionally, each slave device stores its identity to determine its position in the chain of slave devices, and during transmission of a communication frame data is passed from a slave input to a slave output in the same clock cycle.

Optionally, during the transmission of an initial communication frame each slave device determines its position in the chain based on a delay between the slave input and slave output for that slave, and thereafter during transmission of subsequent communication frames, data is passed by the slaves from their slave inputs to their slave outputs in the same clock cycle.

Optionally, the method is part of a serial peripheral interface protocol.

According to a fourth aspect of the disclosure there is provided a method of communicating data between devices in a serial communication apparatus, the serial communication apparatus comprising a master device having a master input and a master output, a plurality of slave devices, each comprising a slave input and a slave output, the plurality being arranged in a daisy chain configuration where a first slave device is arranged to receive data from the master output at its slave input and one or more successive slave devices are arranged to receive data from a slave output of a preceding slave device, where, according to the method, each slave device stores its identity to determine its position in the chain of slave devices and during the transmission of a communication frame data is passed from a slave input to a slave output in the same clock cycle.

Optionally, during the transmission of an initial communication frame each slave device is determines its position in the chain based on a delay between the slave input and slave output for that slave, and thereafter during transmission of subsequent communication frames, data is passed by the slaves from their slave inputs to their slave outputs in the same clock cycle.

Optionally, the delay between the slave input and slave output is k bytes, where k is the position of the slave in the chain.

Optionally, the delay between the slave input and slave output is k sub-byte syllables, where k is the position of the slave in the chain.

The disclosure may also according to still further aspects provide a microcontroller that is configured for forming part of the apparatus of the first or second aspects, and for carrying out parts of the methods of the third and fourth aspect, and/or a slave device that is configured for forming part of the apparatus of the first or second aspects, for carrying out parts of the methods of the third and fourth aspects.

BRIEF DESCRIPTION OF THE DRAWINGS

The present disclosure will now be described, by way of example only, with reference to the accompanying drawings.

DETAILED DESCRIPTION

The present disclosure provides an improved SPI daisy chain protocol as compared with existing protocols.

Figure 1:
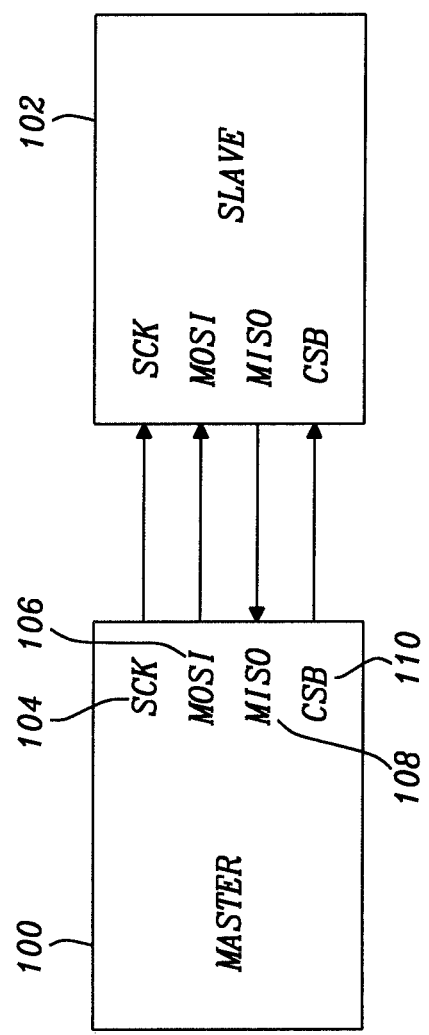
FIG. 1 illustrates the known general principles of a serial peripheral interface system, of the prior art.
Figure 2:
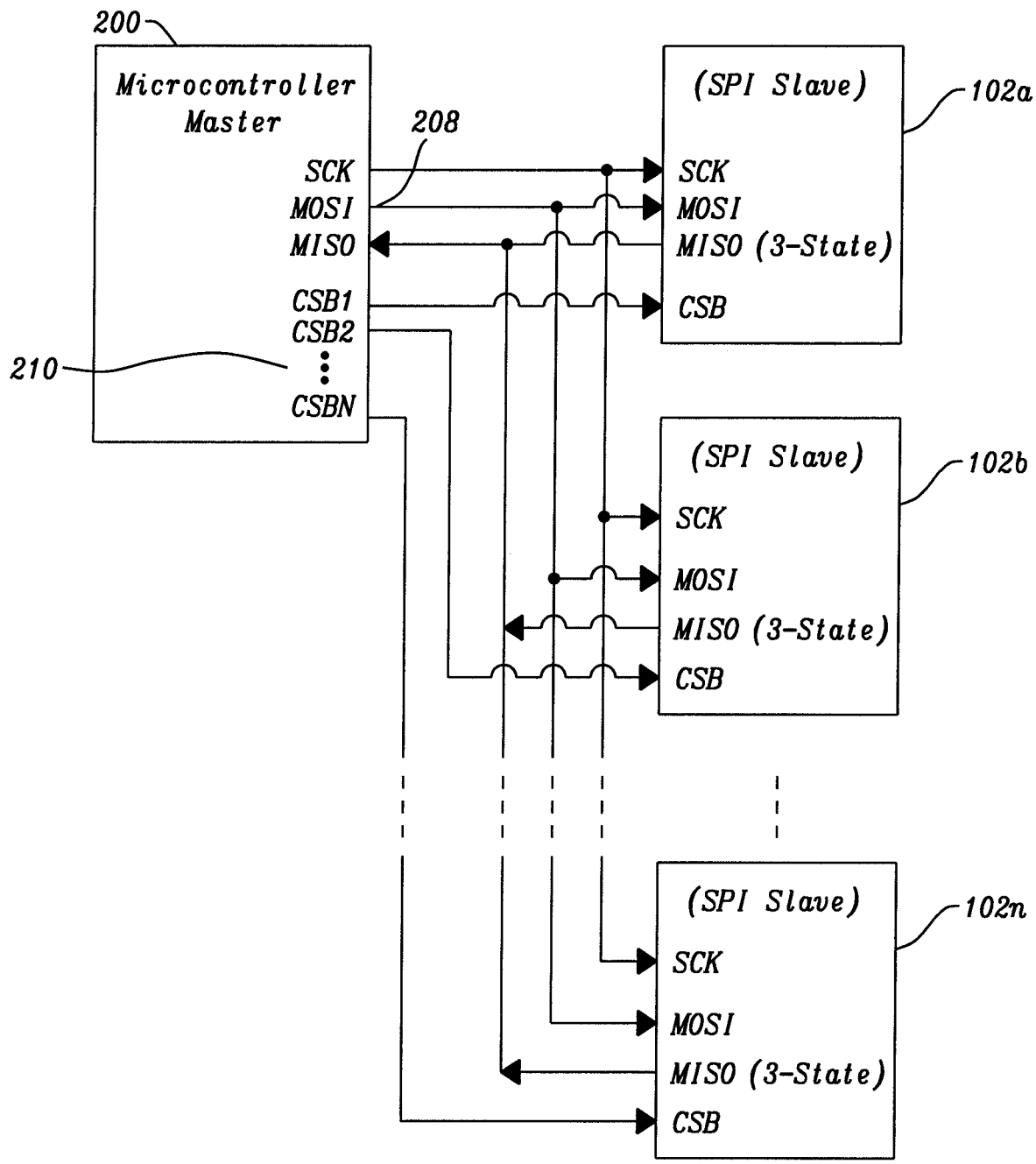
FIG. 2 illustrates an existing parallel connection of multiple slaves in an SPI system, of the prior art.
Figure 3:
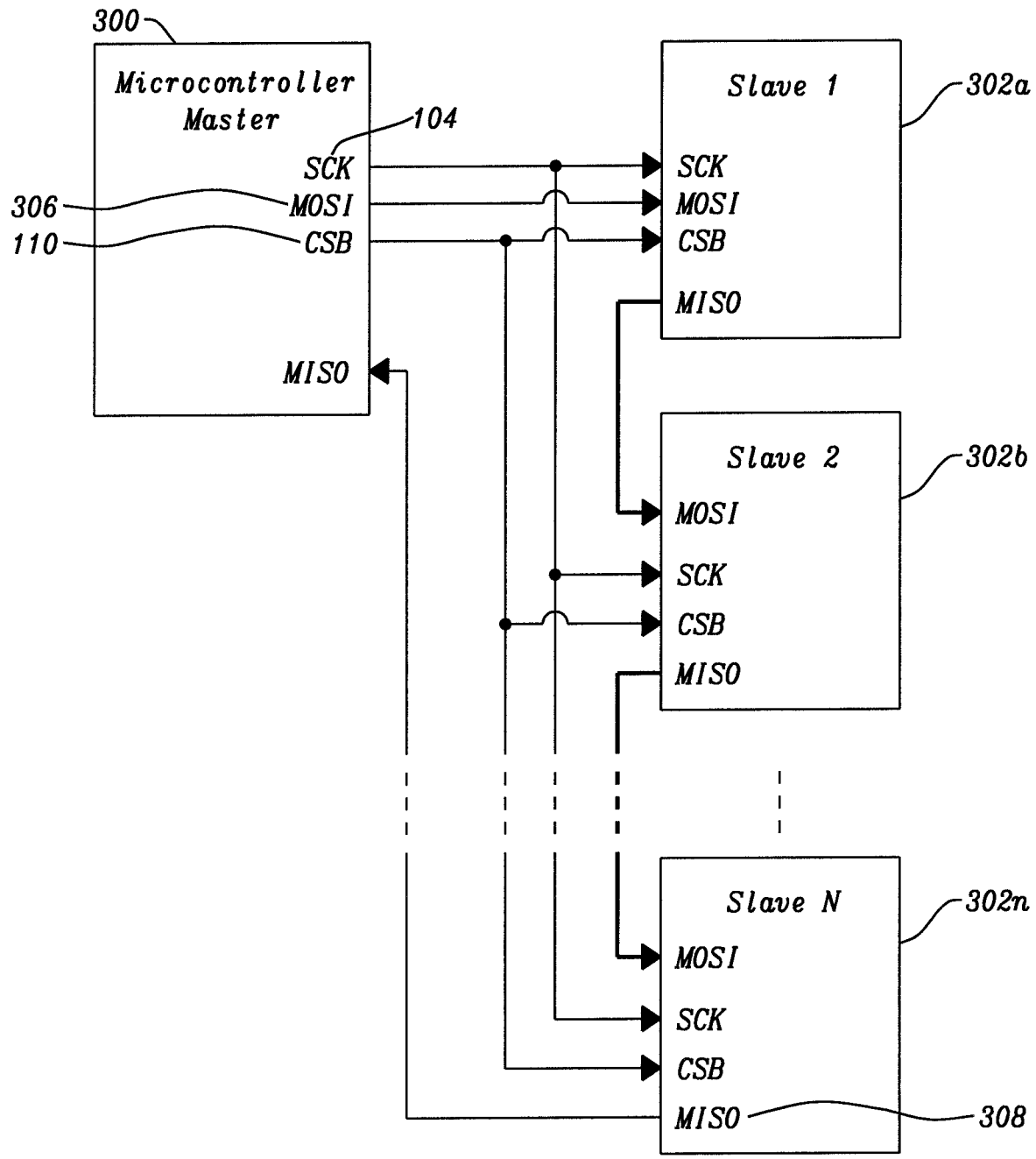
FIG. 3 illustrates an existing daisy-chained connection of slave in an SPI system, of the prior art.
Figure 4:
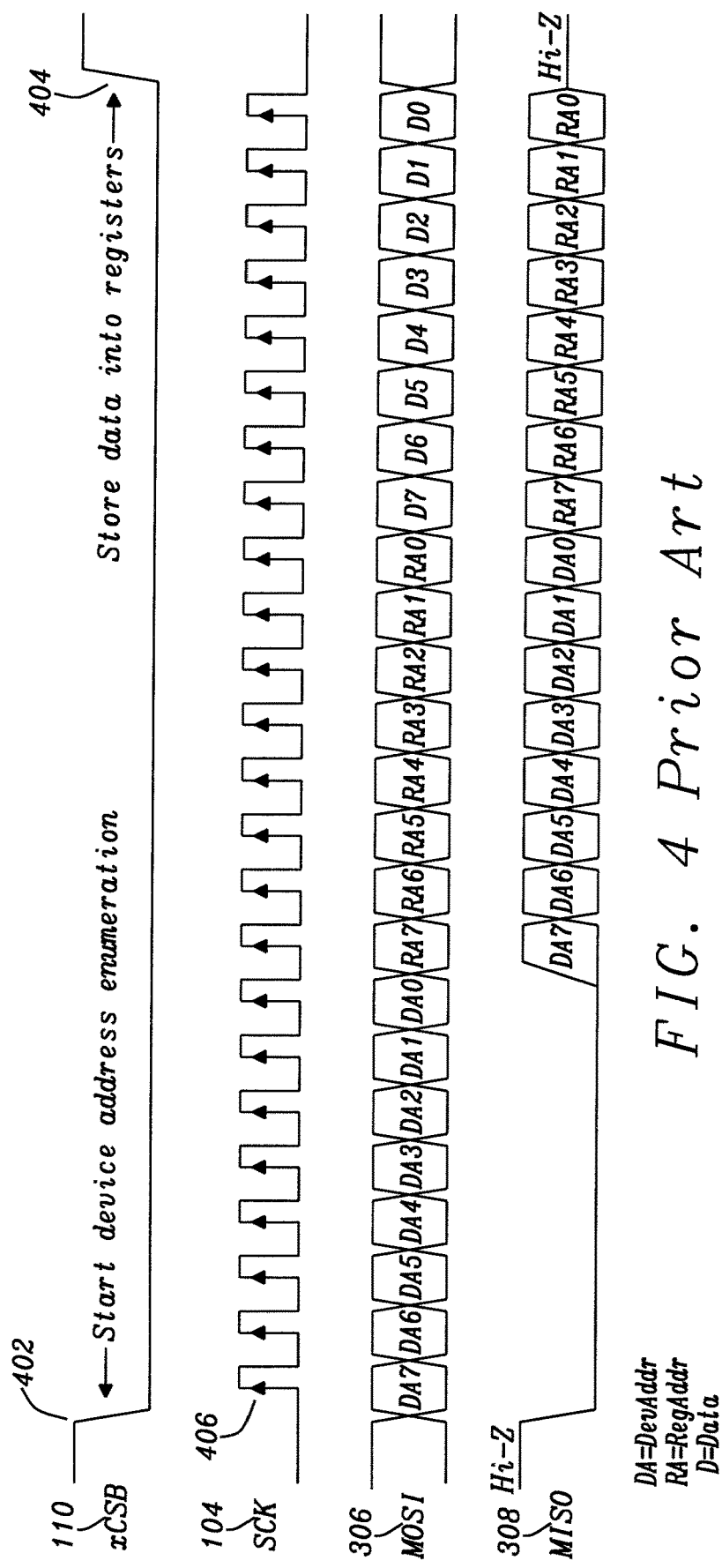
FIG. 4 illustrates the example of writing a single data entry into a single device according to a known SPI communication protocol, of the prior art.
Figure 5:
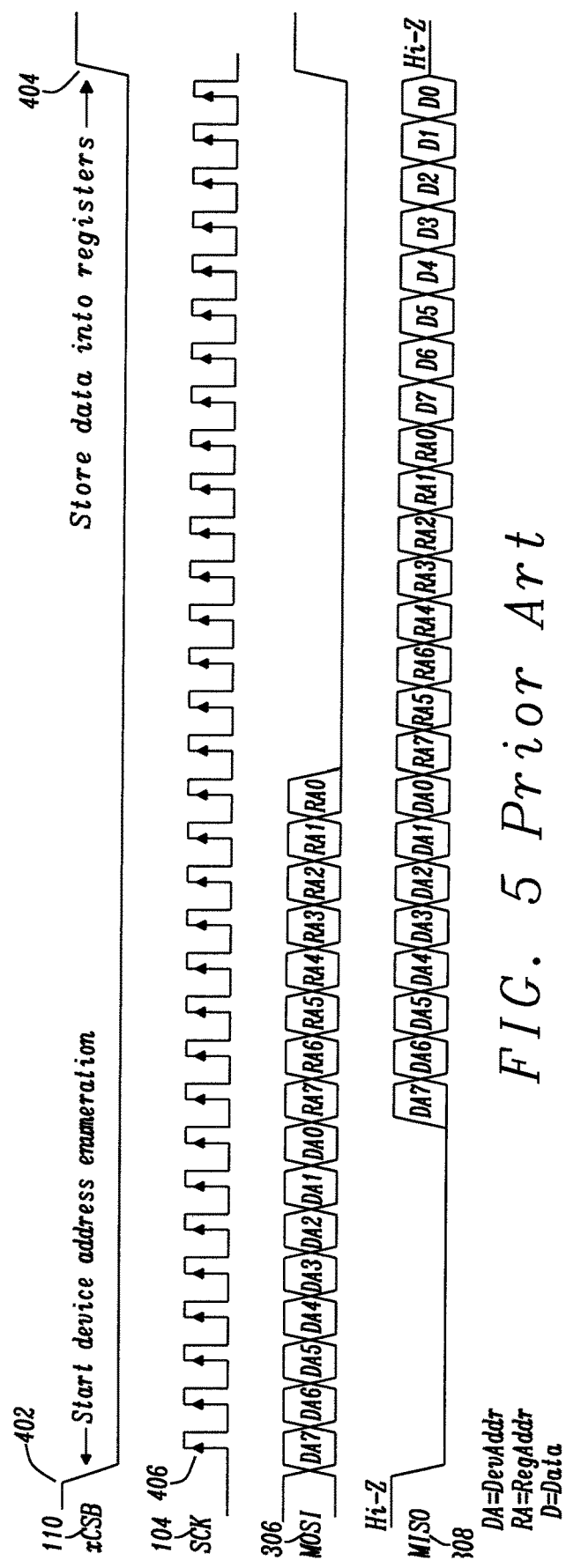
FIG. 5 illustrates the example of reading a single data entry from a single device according to the same known SPI serial connection protocol, of the prior art.

An existing protocol's operation is illustrated with respect to FIGS. 4 and 5, which can be used with a system of daisy chained slave devices as shown in FIG. 3.

The slave select signal CSB 110 is shared between all slaves 302. When it is driven low the slaves are enabled and ready to read and write data. There is a delay of one byte between the slave input signal (MOSI, 306) and the slave output signal (MISO, 308), which appears as a byte's worth of dummy clock cycles at the initial data output by the slave output signal (MISO, 308). Each slave's device address is enumerated by counting the number of empty bytes which are received at the slave input signal (MOSI, 306) after the slave select signal is enabled (or as an equivalent by the number of empty bytes which are output by the slave output signal (MISO, 308)). The slave acts on the data if its enumerated address matches that specified by an address field forming part of a communication frame, as described below.

Once a slave select signal is enabled to commence communication of data between the master and the slaves, the time taken for a command to propagate from the master to any specific slave device of the daisy chained devices is delayed by a number of clock cycles being m*k, where m is the number of bytes in a bit and k is the kth position of the slave device on the chain. The final slave in the chain requires a delay of m*N clock cycles before it receives a command, and for a large chain this delay can cause significant inefficiency.

According to a specification of a serial communications protocol of the disclosure, data is exchanged between master and slave devices in communication frames. Each communication frame has a command portion and a data portion, and each respective portion may comprise packages of one or more bytes.

A byte is a unit of information that comprises a plurality of bits (which can have a value of one or zero). The most common byte size is eight bits, but it will be appreciated that any number of bits can be provided as a byte and that the present disclosure is not limited to any particular byte size.

The command portion of a communication frame includes information about the size of the communication frame, including the number of data bytes, which are included.

The command portion includes a device address, an optional quantity field, and a register address. The data portion comprises one or more data bytes.

The device address comprises one byte and includes as its most significant bit a value, B, meaning broadcast, which is set to B=1 to tell the system that the message is to be broadcast to all devices, or set to B=0 to tell the system to send a normal message to one single device.

The next most significant bit of the device address is a value, S, indicating whether the communication frame is for a data transmission of only one byte (S=1) or for a block of data (S=0). The remaining six bits of the device address byte, DevAddr[5:0], specify the slave address.

As mentioned above, the device address of each slave 302 is automatically set by the position of the slave in the chain. The first device has a device address DevAddr=0x01, the second device in the daisy chain has a device address DevAddr=0x02, and so on.

A first reserved device address, here 0x00, is reserved to indicate that the same data should be written to the same register of all devices (the broadcast bit, B, is set to 1) A second reserved device address, here 0x3F, is used to indicate that different data should be written to the same register of all devices (the broadcast bit, B, is set to 1).

The remaining values, here 0x01 through 0x3E, are used as device addresses for slave devices 1 through 62.

The command portion includes an optional quantity field, which is used only if a block of data is being transmitted (detected by the setting of S=0 in the device address byte as described above). In that case, the quantity field specifies the number of data bytes in the communication frame. It has values from 0x00 to 0xFF.

The command portion includes a register address, defining the register address of the slave device upon which a read or a write operation is to be performed. The most significant bit is labeled RW, meaning read/write, and is set to RW=0 to indicate a write operation to the register address or set to RW=1 to indicate a read operation from the register address.

Following that, the remaining bits of the register address byte, RegAddr[6:0], define the address, and have values of 0x00 through 0x7F.

The communication frame then comprises one or more data bytes, which provide the data payload and have values of 0x00 through 0xFF.

FIG. 4 illustrates an example of writing a single data word into a single device according to this protocol. The diagram shows traces of the slave select signal xCSB 110, the clock SCK 104, together with a slave input MOSI 306 and slave output MISO 308 which are both associated with a first slave device 302.

At time 402, the slave select line 110 falls to start the device address enumeration and is held low until time 404 when the master 300 pulls the signal high to end the transfer of data.

The slave input 306 receives a communication frame from the master comprising a device address byte DA7:DA0, a register address byte RA7:RA0 and a data payload D7:D0.

The communication frame is passed to the slave output 308 after a delay of one byte.

Each successive slave in the daisy chain therefore must wait for a further delay of one byte before it receives the data, which is intended for it. Therefore, if there are N slave devices in one daisy chain, this method requires there to be a delay of m*N dummy clock cycles before the entire chain can be populated, where m is the number of bits in a byte. An additional N−1 bytes of 0x00 must be cycled through.

FIG. 5 illustrates an example of reading a single data word into a single device according to the same protocol. Here it can be seen that if there are N slave devices in a daisy chain, then there is also a delay of m*N dummy clock cycles before the entire chain can be populated, where m is the number of bits in a byte. An additional N+1 bytes of 0x00 must be cycled through.

This protocol is byte aligned and easy to implement with one microprocessor as a master and many other devices as slave devices. However, with increasing numbers of slave devices an increasing amount of information of each device, this byte aligned protocol meets some difficulties when it comes to large data transmissions and the delay involved in propagating data to all the slaves can decrease efficiency to an unacceptable level.

The present disclosure provides a new serial communication protocol, which provides improvements with respect to the protocol mentioned above as well as to the general field. It will be described herein with specific reference to SPI but it will be appreciated that the concepts described herein may have a wider application.

The serial communication according to the disclosure improves transmission efficiency by discarding the requirement to have a delay of one byte between the slave input and a slave output. The delay between slave input and slave output can be chosen to be a sub-byte syllable (such as a bit or a nibble for example); or the delay can be eliminated altogether (meaning that during the transmission of a communication frame data is passed from a slave input to a slave output in the same clock cycle) if the slave devices are stored. The slave devices may be stored in suitable memories in the slaves during an initial enumeration step, which may involve either a byte-delay or a sub-byte syllable delay between slave input and output. The reduction of the delay between slave input and slave output according to either of these aspects alone or in combination can dramatically decrease the amount of time taken for a command to propagate from a master through a daisy chain of slave devices, which improves system efficiency.

An optional feature is to ensure byte alignment from the last slave that loops back to the master microprocessor. This could be provided in cases where the microprocessor cannot handle non-byte-aligned instructions, although if it can, then this feature could be omitted.

According to one aspect of the disclosure, the delay between slave input and output is set to a sub-byte syllable. A "sub-byte syllable" refers generally to one or more bits, which together provide a component of a communication frame. The number of bits is less than the number of bits, which form a byte (so, in the example of an eight-bit byte, a sub-packet syllable may comprise any of one to seven bits). In a preferred embodiment, the sub-byte syllable comprises one bit but it may also comprise two bits or other numbers of bits.

The operation of a serial communication protocol according to specific embodiments of this aspect is shown with respect to FIGS. 6 through 9.

Instead of needing m*N dummy clocks (for m bits per byte over N slave devices), according to the new protocol of this aspect, only N dummy clocks are needed.

Figure 6:
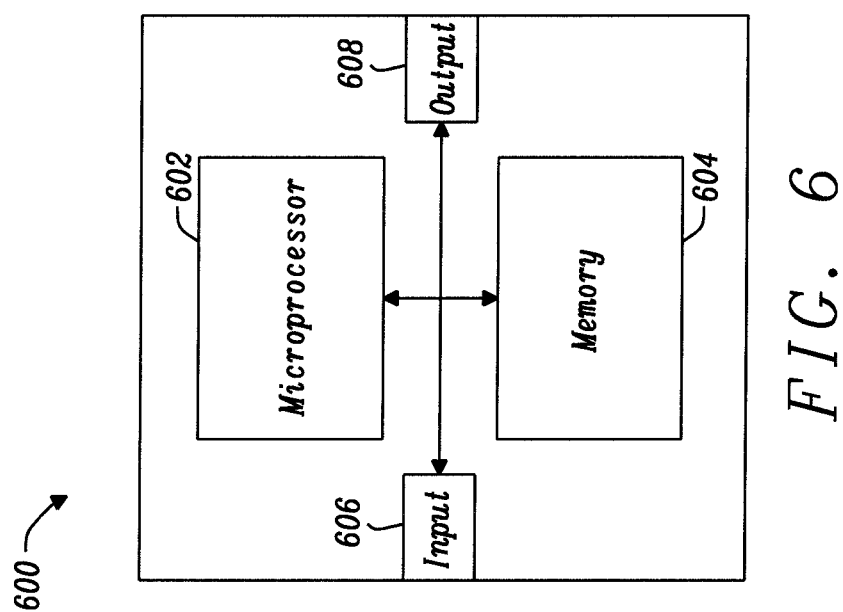
FIG. 6 illustrates the structure of a microcontroller that would be suitable for carrying out the present disclosure.

The protocol might be implemented with a system having a similar set up to that illustrated in FIG. 3. However, a microcontroller according to the disclosure may be provided with customized software and/or firmware, such as ASIC or FPGA, to provide the different functionality according to the disclosure. A microcontroller 600 according to the disclosure is shown in FIG. 6. It will be appreciated that the present disclosure is not limited to any particular type of microcontroller, the only limitations are that in accordance with the attached claims it must provide the relevant outputs for use with the systems and methods claimed herein. Specific microcontroller architectures are outside the scope of the present disclosure, but will be well known to those skilled in the art and need not be described in detail herein.

Generally speaking, a microcontroller 600 according to the present disclosure comprises a microprocessor 602 and memory 604. The microcontroller 600 interfaces with other components via an input 606 and an output 608. The output 608 may in a preferred embodiment include the clock 104 and slave select signal 110 and the MOSI output 306, while the input 606 may include the MISO input 308. It will be appreciated that a microcontroller according to the present disclosure may be provided with multiple additional outputs and/or inputs as will be apparent to one skilled in the art.

According to the disclosure, a new serial communication protocol can be enabled by the recording of instructions in memory 604 to be executed by the microprocessor 602, thus forming a new microcontroller 600 that provides the capabilities of the disclosure which improve upon the existing microcontroller 300 as known in the prior art.

As before (that is, as described with reference to FIGS. 4 and 5), the device address of each slave is automatically set by the position of the slave in the chain.

A first reserved device address, here 0x00, is reserved to indicate that the same data should be written to the same register of all devices.

A second reserved device address, here 0x3F, is used to indicate that different data should be written to the same register of all devices.

A third reserved device address, here 0x3E, is used to indicate the total number of slave devices in the daisy chain.

The remaining values, here 0x01 through 0x3D, are used as device addresses for slave devices 1 through 61.

When the slave select signal is held low (at zero), all slaves will be activated.

The transmission of addressing and data via the MISO and MOSI lines is organized in packages of bytes, each message can be built with one or more of the following types of data, a device address, a number of data, a register address and the payload data.

In a preferred embodiment, the data types may be defined as follows:

Device Address: Addresses a specific slave device and defines protocol information.

| Bit | Meaning | Value |
|---|---|---|
| B | Frame begin flag | Always be high, used as a "frame begin" indicator |
| S | Single byte | S = 0 . . . Block data read or write<br>S = 1 . . . Single data transmission (only one byte) |
| DevAddr[5:0] | Device Address | 0x00 Write same data to same register of all devices<br>0x3F Write different data to same register of all devices<br>0x3E indicate the total device numbers in this daisy chain<br>0x01 to 0x3D. Device addresses for device 1 to 61 |

Quantity Field: Defines the number of data bytes in the data frame if S=0, or the slave device numbers with command 3E.

| Bit | Meaning | Value |
|---|---|---|
| NrOfdata[7:0] | Number of data bytes in frame<br>Or<br>number of device in this daisy chain connection with Device Address = 0x3E | 0x00 to 0xFF |

Register Address: Defines slave device register address to be read or written.

| Bit | Meaning | Value |
|---|---|---|
| RW | Read/Write | RW = 0 write to reg address<br>RW = 1 read from reg address |
| RegAddr[6:0] | Select register address | 0x00 to 0x7F |

Data: contains the data payload.

| Bit | Meaning | Value |
|---|---|---|
| data [7:0] | Data | 0x00 to 0xFF |

In the above example, a reserved address (eg 0x3E), is used to indicate the total number of slave devices in the daisy chain. It is possible to use various different special commands or defined slave registers to inform one slave that it needs to be byte-aligned, that is, to provide properly synchronized signals from its slave output to the master input. The slave can introduce an appropriate delay to ensure that this happens.

A non-limiting example of a slave register implementation is to define one control register "daisy_end_enable" in slave device (register address is 0x00): a value of 0x00 means it is not a final device, while 0x01 means it is the final device. It can be set to 0x00 as default. If the final device is the third device on the chain, the device address=0x03, register address=0x00, data=0x01, and the third device will know it is the final device on the chain, and there is no need for a special command, such as "Device ID=0x3E".

Figure 7:
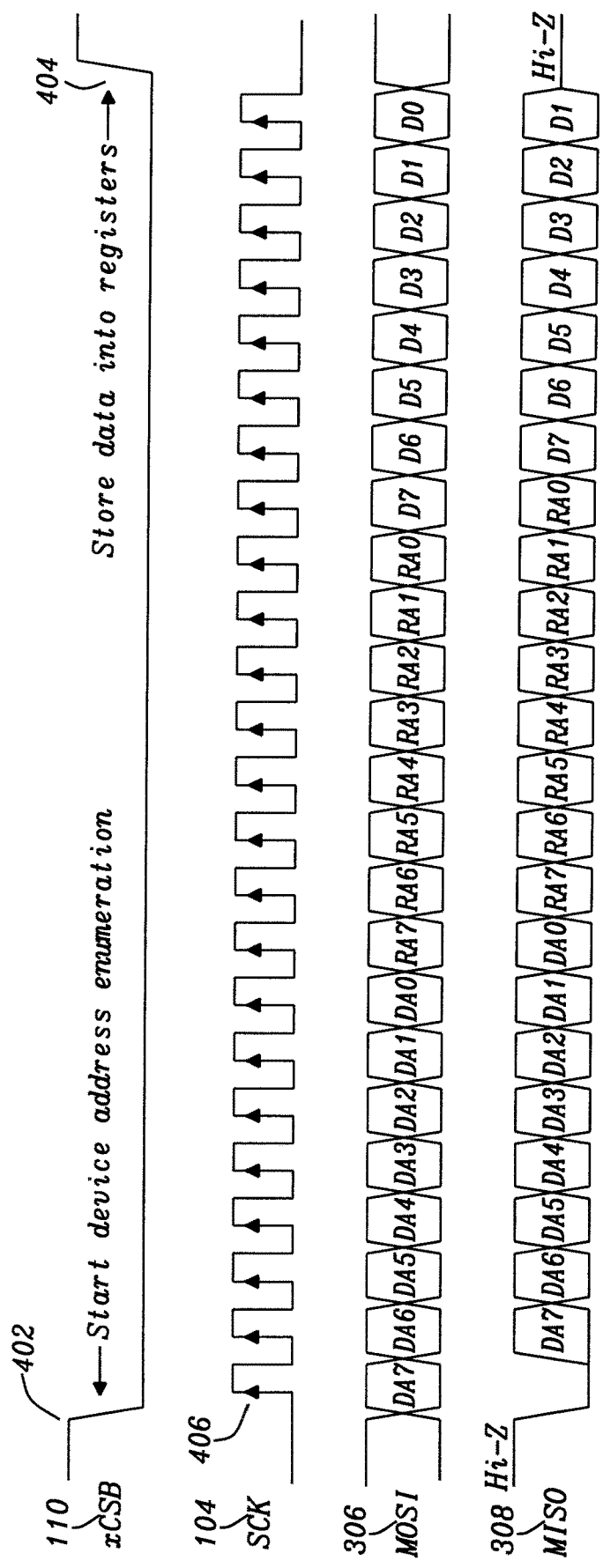
FIG. 7 illustrates the example of writing a single data entry into a single device according to an SPI protocol of the present disclosure.

An example of a write operation using this protocol is shown in FIG. 7, which shows the case of writing data into a single device. The operation is similar to that described above with respect to FIG. 4, except in this case it can be seen that the communication frame is passed to the slave output 308, after a delay of one bit instead of one byte.

Figure 8:
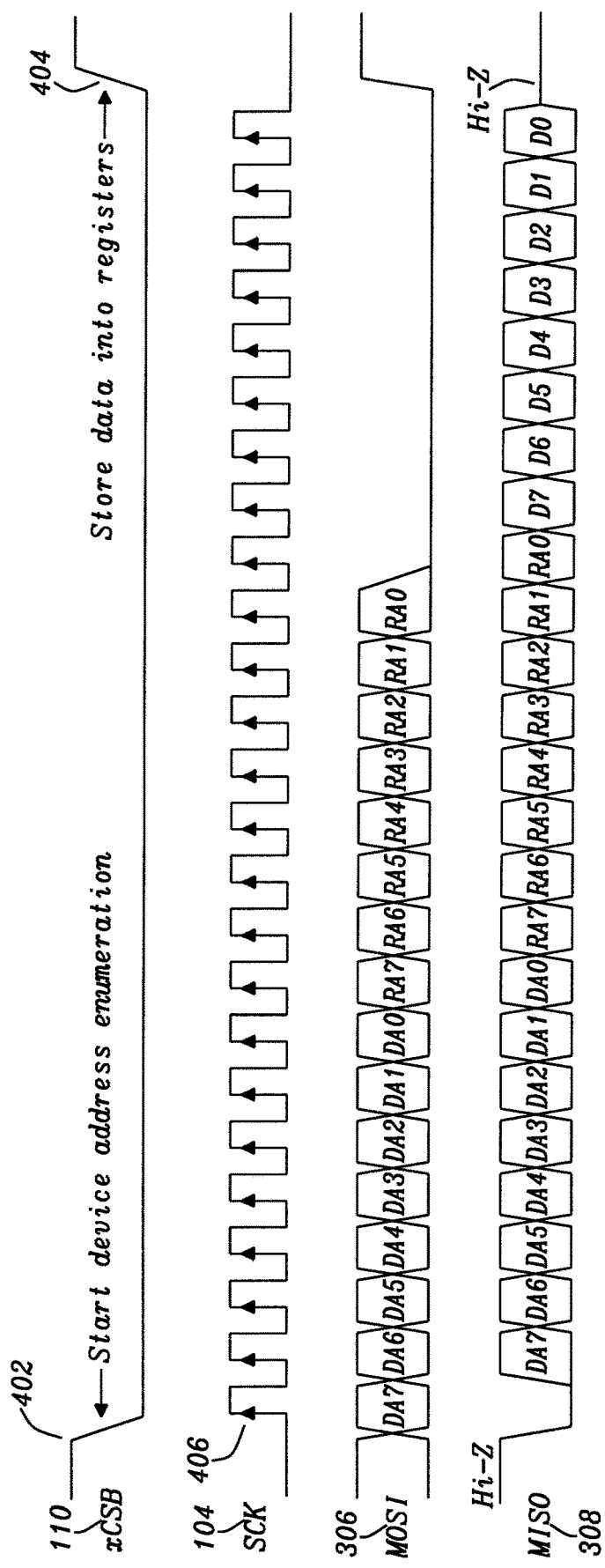
FIG. 8 illustrates the example of reading a single data from a single device according to the protocol illustrated in FIG. 7.

Similarly, FIG. 8 shows an example of reading a single data from a single device. The operation is similar to that described above with respect to FIG. 5, except in this case it can be seen that the communication frame is passed to the slave output 308 after a delay of one bit instead of one byte.

Therefore, it can be seen that the transmission delay is reduced to only one clock cycle from m clock cycles (where there are m clock cycles in one byte, in this case m=8).

Figure 9:
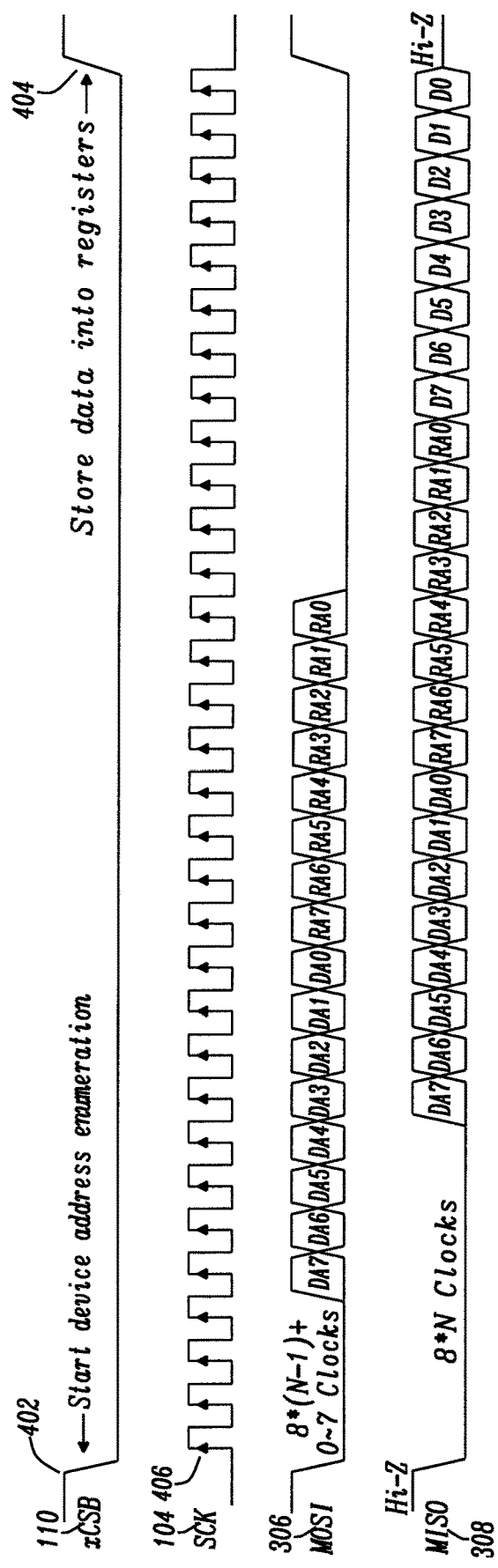
FIG. 9 illustrates the optional byte alignment, which can be provided for a microcontroller that needs it.

As an option, if the slave device is identified as the last device in the daisy chain (which device address is equal to the device number indicated by 0x3E command), the delay clocks can automatically adjust from one clock to a different number of clocks, up to the bit-length of a byte, so that the zeros before the frame begin flag (DA7) of the slave output of the last slave will be always be equal to m*k, to help align the data for the microprocessor, in case it can only deal with byte information. This is illustrated in FIG. 9, in which the selectively increased delay for the last slave device is shown.

According to another aspect of the disclosure, a delay between slave input and slave output in a daisy chain can be eliminated altogether, meaning that during transmission of a communication frame, data is passed from a slave input to a slave output in the same clock cycle. This is possible by storing the slave device addresses at the slave devices. The devices can be hard-coded in the devices, being stored at a suitable non-volatile memory; or they may be enumerated in an initial step, which uses either a byte-delay protocol as illustrated in FIGS. 4 and 5, or a sub-byte syllable delay according to the first aspect and as illustrated in FIGS. 7 through 9.

One non-limiting example of this concept will be discussed here:
1. Every slave device may be provided with one special register (register address 0xFF) named Device_ID[7:0].

| Bit | Meaning | Value |
|---|---|---|
| Dev_addr_en | Device ID enabled | 0: Device ID has not been informed, add delay from MOSI to MISO<br>1: Device ID has been informed, bypass MOSI to MISO |
| Bit[6] | reserved | reserved |
| DevAddr[5:0] | Device Address | Device address calculated from number zeros or zero-bytes from special command or normal operations |

2. At the beginning, Dev_addr_en is default as zero, so the MOSI to MISO is delayed for every slave address.
3. After the first data frame is transferred or with a special command, every device has an individual device ID, by calculating the zero numbers or zero-byte numbers, and setting Dev_addr_en to be high, which means the device ID of each device has been informed. (For a special command, 0x3D can be defined for device ID calculation and Dev_addr_en set to high, and 0x3C for Device ID, and Dev_addr_en both cleared to zero). Note the special command is not necessary.

4. After Dev_addr_en has been set to high, all the slave devices will directly bypass MOSI to MISO, and no extra dummy clocks are needed.

5. One example for read is after Dev_addr_en has been high, and each device has an individual device ID.

Figure 10:
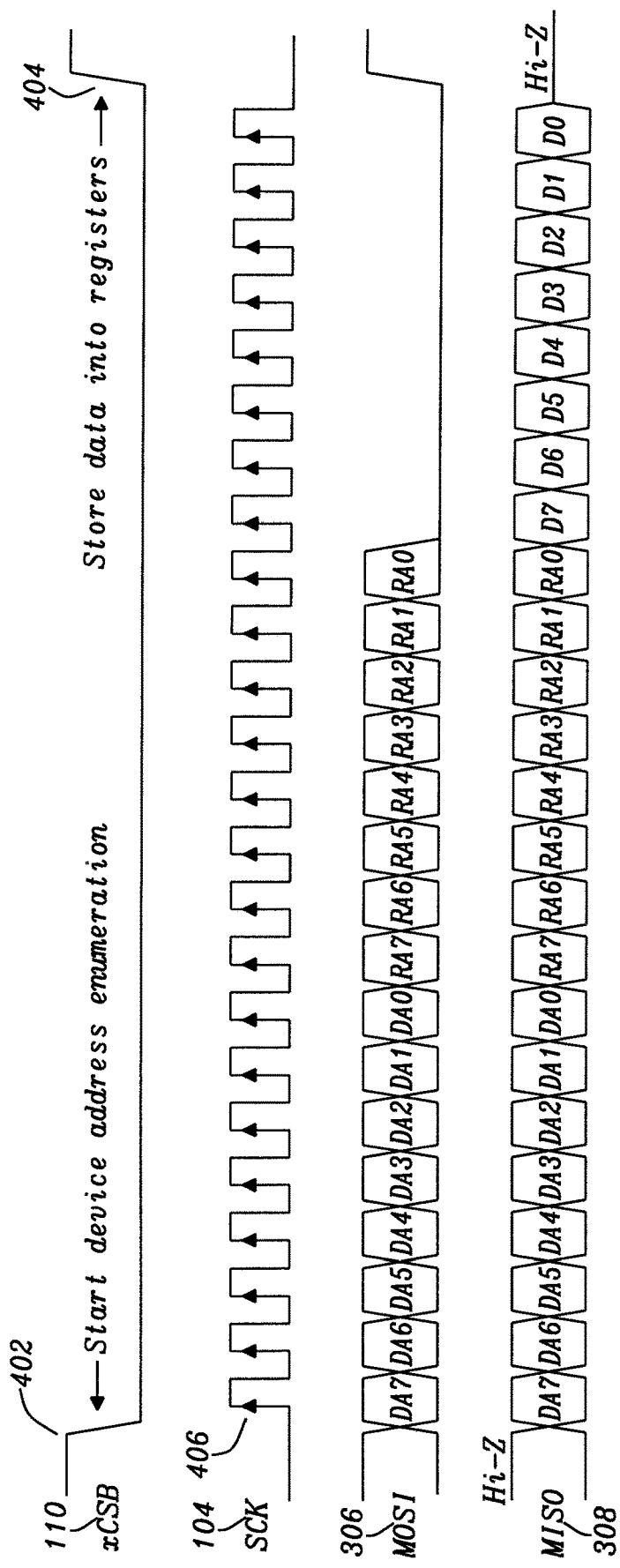
FIG. 10 shows an example of operation of a "zero-delay" embodiment of the disclosure.

The operation of this non-limiting example is shown in FIG. 10. As can be seen, the slave input signal and slave output signal are triggered by the same rising clock edge 406.

Figure 11:
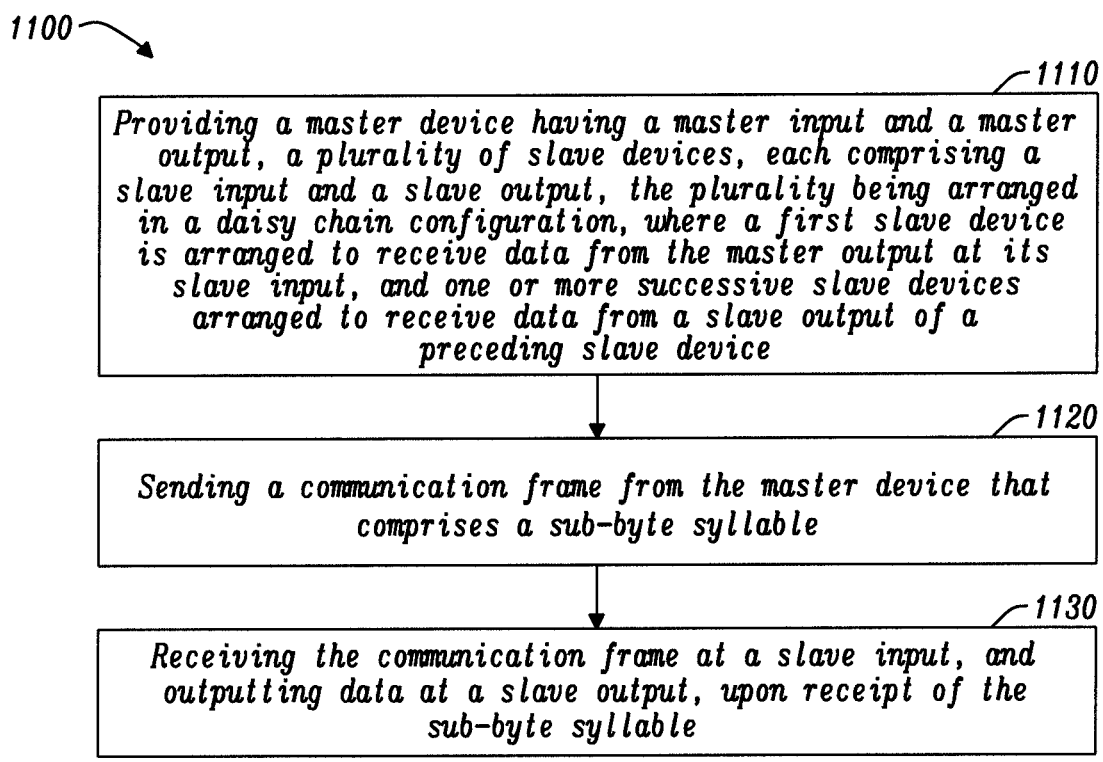
FIG. 11 shows a flow chart of an example method for a serial communication protocol.

FIG. 11 shows flow chart 1100, of an example method for a serial communication protocol. The steps include 1110, providing a master device having a master input and a master output, a plurality of slave devices, each comprising a slave input and a slave output, the plurality being arranged in a daisy chain configuration, where a first slave device is arranged to receive data from the master output at its slave input, and one or more successive slave devices arranged to receive data from a slave output of a preceding slave device. The steps also include 1120, sending a communication frame from the master device that comprises a sub-byte syllable. The steps also include 1130, receiving the communication frame at a slave device input, and outputting data at a slave output, upon receipt of the sub-byte syllable.

Various improvements and modifications can be made to the above without departing from the scope of the disclosure. For example, while the specific embodiments relate to SPI, it will be appreciated that the disclosure may be applied to other protocols.

What is claimed is:

1. A serial communication apparatus, comprising:
a master device having a master input and a master output; and
a plurality of slave devices, each comprising a slave input and a slave output, said plurality being arranged in a daisy chain configuration, wherein a first slave device is arranged to receive data from the master output at its slave input, and one or more successive slave devices are arranged to receive data from a slave output of a preceding slave device, wherein
the master device is arranged to send a communication frame that comprises a sub-byte syllable which selectively triggers transmission of data from a slave input to a slave output, the communication frame including a device address byte defining a slave device address, and said sub-byte syllable being provided as an initial portion of said address byte; and
the triggered transmission of data from slave input to slave output commences before the remainder of the device address byte is received by the slave input.

2. The serial communication apparatus of claim 1, wherein said sub-byte syllable comprises one bit.

3. The serial communication apparatus of claim 2, wherein the one bit is held at a first logic value to indicate the beginning of a communication frame.

4. The serial communication apparatus of claim 1, wherein a final slave device adjusts a delay to ensure that the input to the master device is byte-aligned.

5. The serial communication apparatus of claim 4, wherein the adjustment of the delay is set by a special command embedded in the communication frame, preferably in the address byte.

6. The serial communication apparatus of claim 4, wherein the adjustment of the delay is set by a register in the slave device, which has a value that can be set to inform one slave to be byte-aligned.

7. The serial communication apparatus of claim 1, configured such that each slave device stores its identity to determine its position in the daisy chain of slave devices, and during transmission of a communication frame data, is passed from a slave input to a slave output in the same clock cycle.

8. The serial communication apparatus of claim 7, configured such that:
during the transmission of an initial communication frame, each slave device is configured to determine its position in the daisy chain based on a delay between the slave input and slave output for that slave;
and thereafter during transmission of subsequent communication frames, data is passed by the slaves from their slave inputs to their slave outputs in the same clock cycle.

9. The serial communication apparatus of claim 1, comprising a serial peripheral interface.

10. A serial communication apparatus, comprising:
a master device having a master input and a master output; and
a plurality of slave devices, each comprising a slave input and a slave output, said plurality being arranged in a daisy chain configuration wherein a first slave device is arranged to receive data from the master output at its slave input and one or more successive slave devices are arranged to receive data from a slave output of a preceding slave device, wherein
the serial communication apparatus is configured such that:
during the transmission of an initial communication frame each slave device is configured to determine its position in the daisy chain based on a delay between the slave input and slave output for that slave; and
thereafter during transmission of subsequent communication frames, data is passed by the slaves from their slave inputs to their slave outputs in the same clock cycle.

11. The serial communication apparatus of claim 10 wherein the delay between the slave input and slave output is k bytes, where k is the position of the slave in the daisy chain.

12. The serial communication apparatus of claim 10, wherein the delay between the slave input and slave output is k sub-byte syllables, where k is the position of the slave device in the daisy chain.

13. A method of communicating data between devices in a serial communication apparatus, said serial communication apparatus comprising a master device having a master input and a master output, a plurality of slave devices, each comprising a slave input and a slave output, said plurality being arranged in a daisy chain configuration wherein a first slave device is arranged to receive data from the master output at its slave input and one or more successive slave devices are arranged to receive data from a slave output of a preceding slave device, wherein, according to the method,
the master device sends a communication frame that comprises a sub-byte syllable the communication frame including a device address byte defining a slave device address, and said sub-byte syllable being provided as an initial portion of said address byte; a slave device receives the communication frame at its slave input; and the sub-byte syllable selectively triggers transmission of data from a slave input to a slave output, wherein the triggered transmission of data from slave input to slave output commences before the remainder of the device address byte is received by the slave input.

14. The method of claim 13, wherein said sub-byte syllable comprises one bit.

15. The method of claim 14, wherein the one bit is held at a first logic value to indicate the beginning of a communication frame.

16. The method of claim 13, wherein a final slave device adjusts a delay to ensure that the input to the master device is byte-aligned.

17. The method of claim 16, wherein the adjustment of the delay is set by a special command embedded in the communication frame, preferably in the address byte.

18. The method of claim 16, wherein the adjustment of the delay is set by a register in the slave device, which has a value that can be set to inform one slave to be byte-aligned.

19. The method of claim 13, wherein each slave device stores its identity to determine its position in the daisy chain of slave devices, and during transmission of a communication frame, data is passed from a slave input to a slave output in the same clock cycle.

20. The method of claim 19, wherein:
during the transmission of an initial communication frame each slave device determines its position in the daisy chain based on a delay between the slave input and slave output for that slave;
and thereafter during transmission of subsequent communication frames, data is passed by the slaves from their slave inputs to their slave outputs in the same clock cycle.

21. The method of claim 13, being part of a serial peripheral interface protocol.

22. A method of communicating data between devices in a serial communication apparatus, said serial communication apparatus comprising a master device having a master input and a master output, a plurality of slave devices, each comprising a slave input and a slave output, said plurality being arranged in a daisy chain configuration wherein a first slave device is arranged to receive data from the master output at its slave input, and one or more successive slave devices are arranged to receive data from a slave output of a preceding slave device, wherein, according to the method,
during the transmission of an initial communication frame each slave device determines its position in the chain based on a delay between the slave input and slave output for that slave;
and thereafter during transmission of subsequent communication frames, data is passed by the slaves from their slave inputs to their slave outputs in the same clock cycle.

23. The method of claim 22, wherein the delay between the slave input and slave output is k bytes, where k is the position of the slave in the daisy chain.

24. The method of claim 22, wherein the delay between the slave input and slave output is k sub-byte syllables, where k is the position of the slave device in the daisy chain.

* * * * *